(No Model.)

H. EDMUNDS.
ARMORING OR COVERING FOR ELECTRIC CABLES.

No. 569,748. Patented Oct. 20, 1896.

Attest:
Geo. M. Copenhaver.

Inventor:
Henry Edmunds
by Pollok & Mauro,
his attorneys

UNITED STATES PATENT OFFICE.

HENRY EDMUNDS, OF LONDON, ENGLAND.

ARMORING OR COVERING FOR ELECTRIC CABLES.

SPECIFICATION forming part of Letters Patent No. 569,748, dated October 20, 1896.

Application filed August 27, 1896. Serial No. 604,078. (No model.)

*To all whom it may concern:*

Be it known that I, HENRY EDMUNDS, electrical engineer, a subject of the Queen of Great Britain and Ireland, residing at 39 Victoria Street, in the city of Westminster, London, England, have invented certain Improvements in Armorings or Coverings for Electric Cables, of which the following is a specification.

My invention relates to armorings or coverings for electric cables, the object of my invention being to effect economy in the manufacture and to improve the article produced.

According to my invention the wires of which the armoring or covering is made are of two different forms alternating with each other, one of the said forms being the ordinary round or equivalently-shaped wires and the other being formed in cross-section with side recesses to receive the sides of the adjacent round or equivalent wires, so that these latter wires are held by the two adjacent wires by engaging with the recesses in the sides thereof, while the said recessed wires are in turn held by the two adjacent round or equivalent wires.

Figure 1:
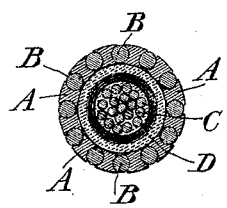
Figure 2:
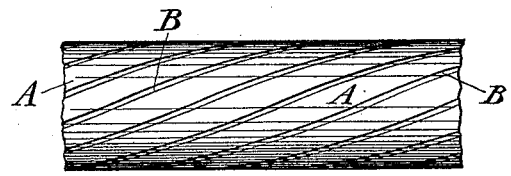

Figure 1 of the accompanying drawings is a cross-section of a cable, and Fig. 2 is a side elevation of a portion of a cable provided with an armoring or covering according to my invention.

A are the wires, formed with recesses in their sides, and B are round wires held in the said recesses when the wires are placed together, as shown.

C are the internal conducting-wires of the cable, and D shows the insulating and protecting material around them.

An armoring or covering for electric cables can thus be made much more economically than hitherto, as the wires B are of the ordinary round or equivalent section and only the remainder (the wires A) are of special section. In cases where the armoring or covering is to be used as a conductor the wires can be made of copper or like good conductive metal, or the one set (usually the wires B) can be made of copper or like good conductive metal and the others (the wires A) be made of iron or like strong protective metal; but I do not limit myself to the material of of which the wires A and B are made.

Having described the nature of my invention and explained the manner in which it may be carried into effect, I claim—

1. Armorings or coverings for electric cables the said armorings or coverings being made of wires of ordinary round form alternating with wires having recesses at their sides in which the first-named wires engage substantially as and for the purposes herein specified.

2. Armorings or coverings for electric cables the said armorings or coverings being made of wires of ordinary round form alternating with wires having recesses at their sides in which the first-named wires engage one set of wires being made of copper or other good conductive metal and the other set being made of iron or other strong protective material substantially as herein specified.

In testimony whereof I have signed my name to this specification in the presence of two subscribing witnesses.

HENRY EDMUNDS.

Witnesses:
 WILLIAM F. UPTON,
 A. H. HOWARD.